United States Patent [19]

Wakui

[11] Patent Number: 5,241,251

[45] Date of Patent: Aug. 31, 1993

[54] DRIVE SIGNAL GENERATING DEVICE

[75] Inventor: Yoshio Wakui, Tokyo, Japan

[73] Assignee: Asahi Kogaku Kogyo Kabushiki Kaisha, Tokyo, Japan

[21] Appl. No.: 696,026

[22] Filed: May 6, 1991

[30] Foreign Application Priority Data

May 21, 1990 [JP] Japan ................................. 2-129156

[51] Int. Cl.⁵ ............................ H02P 5/41; H02P 6/02
[52] U.S. Cl. ...................................... 318/599; 318/560;
318/561; 318/254; 318/138; 369/44.29;
369/44.34; 360/74.4
[58] Field of Search ........................... 318/560-636,
318/138, 254, 710-715, 800-812, 721;
360/72-79; 369/44.29, 44.34, 58, 54; 363/40,
41, 98, 132

[56] References Cited

U.S. PATENT DOCUMENTS

| | | | |
|---|---|---|---|
| 4,153,853 | 5/1979 | DeVilleneuve | 318/599 |
| 4,309,645 | 1/1982 | DeVilleneuve | 318/139 |
| 4,480,299 | 10/1984 | Muto et al. | 318/802 |
| 4,490,666 | 12/1984 | Tanamachi et al. | 318/800 |
| 4,562,549 | 12/1985 | Tanaka et al. | 364/486 |
| 4,642,537 | 2/1987 | Young | 318/254 |
| 4,678,980 | 7/1987 | Sugimoto et al. | 318/759 |
| 4,682,095 | 7/1987 | Shibata et al. | 318/778 |
| 4,757,241 | 7/1988 | Young | 318/254 |
| 4,788,485 | 11/1988 | Kawagishi et al. | 318/811 |
| 4,823,247 | 4/1989 | Tamoto | 363/16 |
| 4,851,743 | 7/1989 | Schmerda et al. | 388/811 |
| 4,851,751 | 7/1989 | Gipson | 318/599 |
| 4,898,361 | 2/1990 | Bender et al. | |
| 4,977,507 | 12/1990 | Matsuoka et al. | 364/424.05 |
| 5,003,196 | 3/1991 | Kawaguchi | 307/290 |
| 5,079,437 | 1/1992 | Monroe | 307/38 |
| 5,086,261 | 2/1992 | Sakata et al. | 388/811 |
| 5,095,254 | 3/1992 | Ueki | 318/138 |
| 5,101,391 | 3/1992 | Ishii et al. | 369/44.29 |

FOREIGN PATENT DOCUMENTS

| | | |
|---|---|---|
| 0005311 | 11/1979 | European Pat. Off. . |
| 4015854 | 11/1991 | Fed. Rep. of Germany . |
| 61-258607 | 4/1987 | Japan . |
| 61-262006 | 4/1987 | Japan . |
| 01-308183 | 2/1990 | Japan . |
| 8500924 | 2/1985 | PCT Int'l Appl. . |
| 2015210 | 9/1979 | United Kingdom . |
| 2040086 | 8/1980 | United Kingdom . |
| 2111730 | 7/1983 | United Kingdom . |
| 2145884 | 4/1985 | United Kingdom . |
| 2160339 | 12/1985 | United Kingdom . |
| 2184872 | 7/1987 | United Kingdom . |
| 2231778 | 11/1990 | United Kingdom . |

*Primary Examiner*—Paul Ip
*Attorney, Agent, or Firm*—Sandler Greenblum & Bernstein

[57] ABSTRACT

A drive signal generating device for outputting a pulse signal to a spindle motor for driving a magnetic disk, to thereby rotate the motor in accordance with the pulse signal. The rotational speed of the motor is deter mined by the pulse width and pulse period of the pulse signal. The amplitude of the pulse signal is lowered as the source voltage of a power source is lowered, and the pulse period is shortened as the source voltage is lowered.

8 Claims, 7 Drawing Sheets

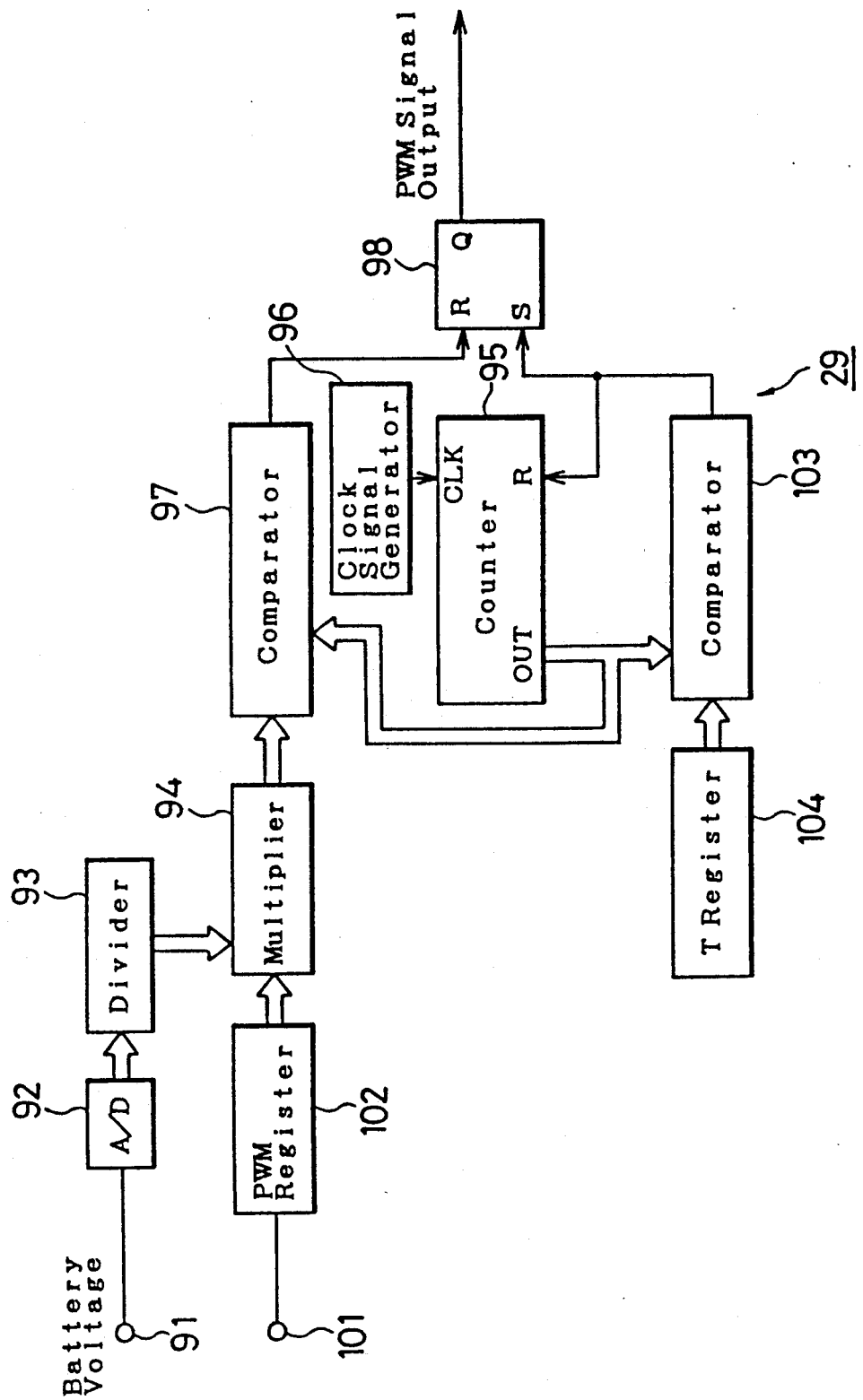

DRIVE SIGNAL GENERATING DEVICE

BACKGROUND OF THE INVENTION

1. Field of the Invention

The present invention relates to a device for driving a motor of a disk device provided in, for example, an electronic still video camera, and more particularly, to a drive signal generating device which generates a pulse signal for driving the motor.

2. Description of the Related Art

In an electronic still camera, or a built-in type VTR camera, a magnetic disk or a magnetic tape is used as a recording medium, and a motor for driving the magnetic disk or the magnetic tape is operated by a servo control. In these devices, considering that the dissipation of power is large, and that a battery is used as the power source, in order to keep the dissipation of power as low as possible, a drive circuit for the motor is usually controlled by a PWM (pulse width modulation) method, i.e., a switching regulator method. Electric power for driving the motor is supplied directly to the motor and does not go through a regulator, because if the electric power is supplied through the regulator, the electric power supply efficiency is lowered.

However, in such a conventional construction in which the electric power is supplied directly to the motor, if the source voltage is changed, the servo characteristic for driving the motor is changed. Thus, control of the motor becomes difficult.

SUMMARY OF THE INVENTION

Accordingly, an object of the present invention is to provide a drive signal generating device by which an operating characteristic of a mechanism, such as the motor, is not changed, even if the source voltage is changed, and the mechanism is usually controlled by a predetermined operating characteristic.

According to the present invention, there is provided a drive signal generating device for outputting a pulse signal to a mechanism which is operated in accordance with the pulse signal. The drive signal generating device comprises a power source for outputting a source voltage, a generating mechanism, and a control mechanism. The generating mechanism generates the pulse signal. The control mechanism controls at least one of a pulse width and a pulse period of the pulse signal, in accordance with the source voltage.

Further, according to the present invention, there is provided a drive signal generating device for outputting a pulse signal to a mechanism which is operated in accordance with the pulse signal. The drive signal generating device comprises a power source that outputting a source voltage, first and second outputs mechanisms, and a generating mechanism. The first outputting mechanism outputs a first signal at a frequency that is higher than the frequency of the second outputting mechanism as the source voltage is lowered. The second outputting mechanism outputs a second signal at a predetermined timing. The generating mechanism generates a pulse signal having a high level when the first signal is inputted thereto and having a low level when the second signal is inputted thereto, whereby a pulse period of the pulse signal becomes shorter as the source voltage is lowered.

Still further, according to the present invention, there is provided a drive signal generating device for outputting a pulse signal to a mechanism which is operated in accordance with the pulse signal. The drive signal generating device comprises a power source that outputs a source voltage, first and second outputting mechanisms, and a generating mechanism. The first outputting mechanism outputs a first signal at a predetermined timing. The second outputting mechanism outputs a second signal at a frequency that is lower than the frequency of the first outputting mechanism as the source voltage is lowered. The generating mechanism generates a pulse signal having a high level when the first signal is inputted thereto, and having a low level when the second signal is inputted thereto, whereby a pulse width of the pulse signal becomes longer as the source voltage is lowered.

Furthermore, according to the present invention, there is provided a drive signal generating device for outputting a pulse signal to a motor for driving a magnetic disk. The motor is rotated at a speed which is in accordance with a width of the pulse signal and a pulse period of the pulse signal. The drive signal generating device comprises a power source, a generating mechanism, and a control mechanism. The generating mechanism generates the pulse signal corresponding to a source voltage outputted by the power source, and the control mechanism controls at least one of the pulse period and the pulse width in accordance with the source voltage, whereby the motor is rotated at a predetermined constant speed regardless of the amount of source voltage supplied.

Further, according to the present invention, there is provided a device for generating a pulse signal, and a mechanism operated in accordance with an equivalent voltage determined by a pulse width and a pulse period of the pulse signal. The device comprises a power source for outputting a source voltage, a generating mechanism, and a control mechanism. The generating mechanism generates a pulse signal having an amplitude which becomes lower as the source voltage becomes lower, and the control mechanism controls at least one of the pulse period and the pulse width, whereby the mechanism is operated with a constant performance regardless of the amount of the source voltage supplied.

BRIEF DESCRIPTION OF THE DRAWINGS

The present invention will be better understood from the description of preferred embodiments of the invention set forth below, together with the accompanying drawings, in which:

FIG. 9 is a diagram of a PWM signal generating circuit of the second embodiment of the present invention.

DESCRIPTION OF THE PREFERRED EMBODIMENTS

Figure 1:
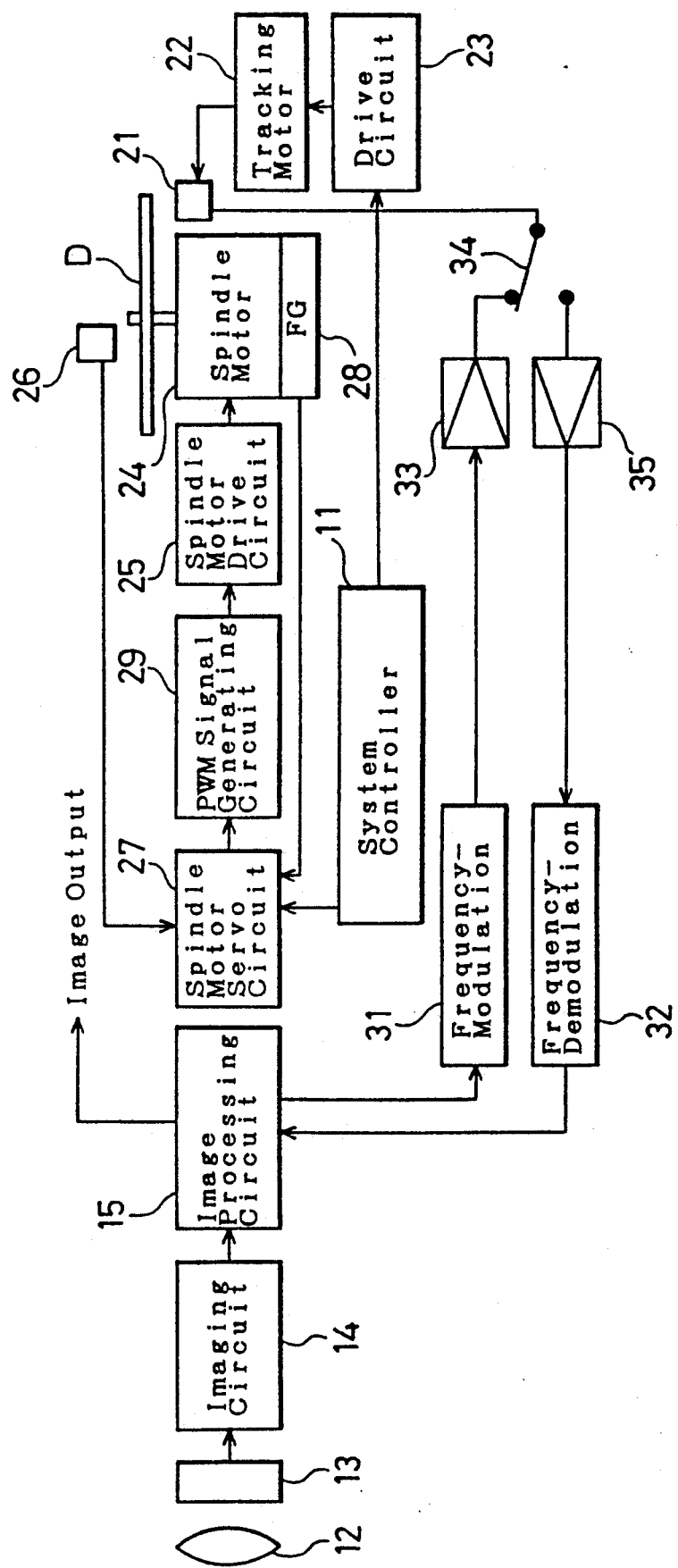
FIG. 1 is a block diagram of a control circuit of an electronic still camera to which an embodiment of the present invention is applied.

The present invention will now be described with reference to embodiments shown in the drawings.

FIG. 1 shows a control circuit housed in an electronic still camera to which an embodiment according to the present invention is applied.

A system controller 11, such as a microcomputer, carries out a control of the whole electronic still camera. An image of an object is formed on an image sensor 13 through a lens 12. The image sensor 13 is connected to an image processing circuit 15 through an imaging circuit 14, so that an image formed on the image sensor 13 is inputted to the image processing circuit 15 through the imaging circuit 14. In the image processing circuit 15, an image signal, inputted from the imaging circuit 14, is divided into differential color signals and a luminance signal; two differential color signals (R-Y, B-Y) being arranged alternately at each 1H (horizontal scanning period). The image processing circuit 15 is connected to an image output terminal. Thus, the image can be observed by connecting a display device (not shown) to the image output terminal.

In a disk drive device, a magnetic head 21 is constructed such that it is displaced by a tracking motor 22, in a radial direction of a magnetic disk D. The tracking motor 22 is driven and controlled by a tracking motor drive circuit 23. The magnetic disk D is rotated by a spindle motor 24, which is driven and controlled by a spindle motor drive circuit 25. A PWM signal generating circuit 29, connected to a spindle motor drive circuit 25, generates a pulse signal for driving the spindle motor 24. A spindle motor servo circuit 27 is connected to the PWM signal generating circuit 29, and supplies a signal corresponding to a set rotational speed of the spindle motor 24, to the PWM signal generating circuit 29.

A PG coil 26 is provided for sensing a timing of one rotation of the magnetic disk D. The PG coil 26 is connected to the spindle motor servo circuit 27. A frequency signal generator 28 provided in the spindle motor 24 is also connected to the spindle motor servo circuit 27. Accordingly, the spindle servo circuit 27 is supplied with a signal denoting the rotational angular position by the PG coil 26, and a signal denoting a rotational speed of the spindle motor 24 by the frequency signal generator 28, to control the rotational speed and a rotation phase of the spindle motor 24. Note that the tracking motor drive circuit 23 and the spindle servo circuit 27 are connected to the system controller 11, and are controlled thereby.

The luminance signal and the two differential color signals of an image signal are frequency-modulated, and are multiplex-recorded in a same recording track. For this recording, a frequency-modulation circuit 31 and a frequency-demodulation circuit 32 are connected to the image processing circuit 15. The frequency-modulation circuit 31 is connected to the magnetic head 21 of the disk drive device through a recording amplifier 33 and a switch 34. The frequency-demodulation circuit 32 is connected to the magnetic head 21 through a reproducing amplifier 35 and the switch 34.

The switch 34 is controlled by the system controller 11, and is selectively switched to a side of the frequency-modulation circuit 31 or a side of the frequency-demodulation circuit 32. Namely, the switch 34 connects the frequency-modulation circuit 31 and the recording amplifier 33 to the magnetic head 21 when recording image data to the magnetic disk D, so that the image signal is frequency-modulated and recorded to the magnetic disk D. Conversely, the switch 34 connects the frequency-demodulation circuit 32 and the reproducing amplifier 35 to the magnetic head 21 when reproducing image data recorded on the magnetic disk D, so that the image signal is frequency-demodulated and inputted to the image processing circuit 15, in which the image signal is subjected to a predetermined process and outputted to the image output terminal.

Figure 2:
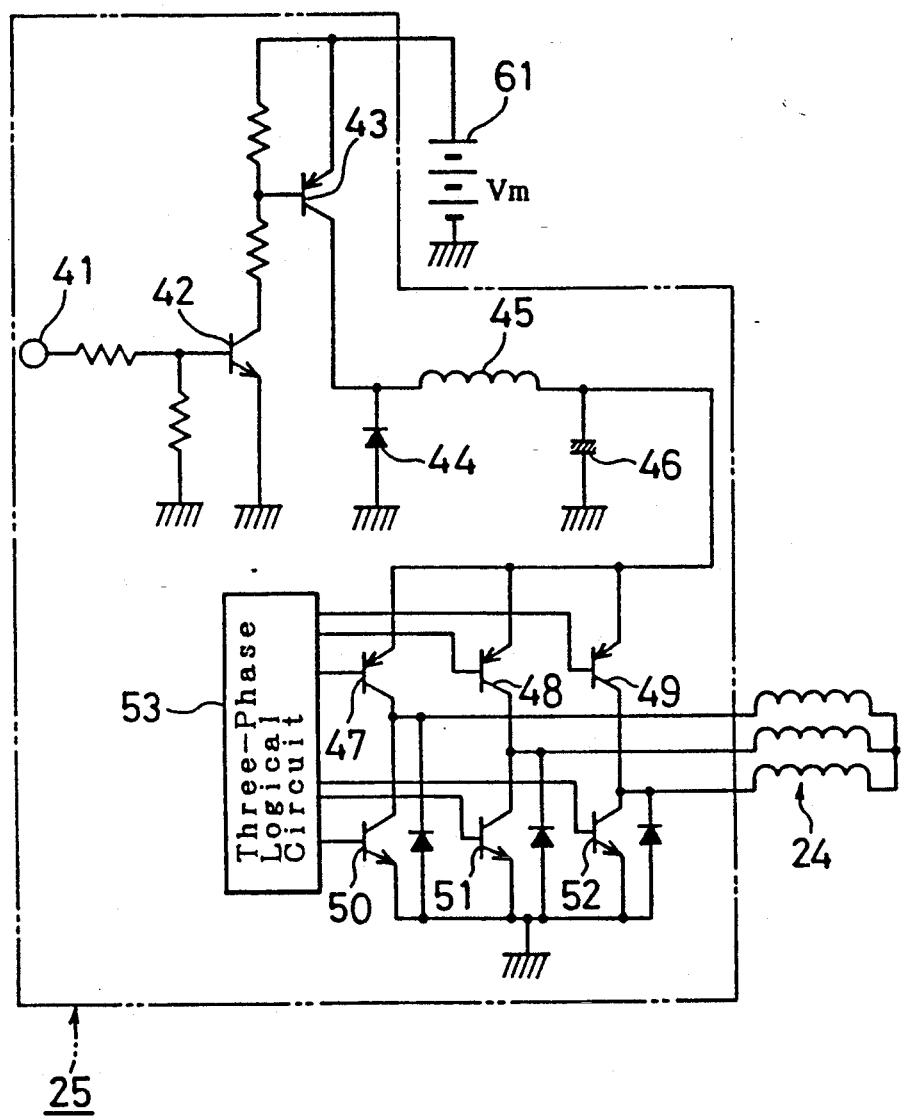
FIG. 2 is a block diagram of a spindle motor drive circuit.

FIG. 2 shows a construction of the spindle motor drive circuit 25.

Figure 3:
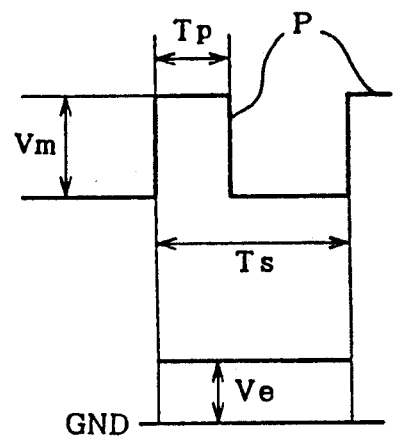
FIG. 3 is a diagram showing a relationship between a voltage of a pulse signal and an equivalent voltage.

An input terminal 41 is connected to the PWM signal generating circuit 29 (FIG. 1). A pulse signal P, as shown in FIG. 3, is inputted to the spindle motor drive circuit 25 through the input terminal 41. When the pulse signal P is inputted to the spindle motor drive circuit 25, a switching circuit composed of transistors 42 and 43 is turned ON so that a voltage Vm of a battery 61, which is the power source, is supplied to the spindle motor 24. A smoothing circuit composed of a flywheel diode 44, a choke coil 45 and a capacitor 46 is provided for smoothing a change of voltage supplied to the spindle motor 24 from the battery 61.

The spindle motor 24 is a three-phase brushless motor, and is rotated by an exciting force generated by an electric current flowing in three stator windings provided in the spindle motor 24. A passage through which the electric current flows is controlled by a switching circuit composed of transistors 47, 48, 49, 50, 51 and 52, which are turned ON and OFF by a three-phase logical circuit 53.

Note, in FIG. 2, the spindle motor 24 and the battery 61 are not included in the spindle motor drive circuit 25.

FIG. 3 shows a pulse signal P inputted to the spindle motor drive circuit 25 from the PWM signal generating circuit 29.

As shown in this drawing, the pulse signal P has a pulse amplitude corresponding to the voltage Vm of the battery 61. The pulse width Tp has a magnitude corresponding to a drive force supplied to the spindle motor 24, and is determined by the spindle servo circuit 27. A sampling time Ts, i.e., a pulse interval (a pulse period) between two adjacent pulse signals P, is determined by the PWM signal generating circuit 29. Although the sampling time Ts is constant in a conventional device, the sampling time Ts in this embodiment has a length corresponding to the voltage of the battery 61, as described later.

As shown in FIG. 3, the pulse signal P is smoothed to become a signal having an equivalent voltage Ve, and is supplied to the spindle motor 24. This smoothing is carried out by the smoothing circuit composed of the choke coil 45 and so on (shown in FIG. 2). The equivalent voltage Ve is obtained by the following equation:

$$Vm \times Tp = Ve \times Ts \qquad (1)$$

Figure 4:
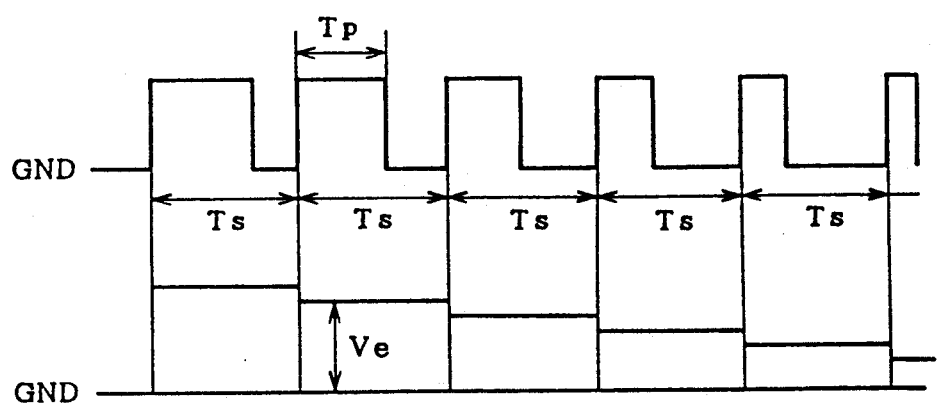
FIG. 4 is a diagram showing a relationship between a pulse width of a pulse signal and an equivalent voltage.

FIG. 4 shows a relationship between the pulse width Tp of the pulse signal P and the equivalent voltage Ve, when the sampling time Ts is constant. As understood from this drawing, the longer the pulse width Tp, the higher the equivalent voltage Ve. That is, the longer the pulse width Tp, the higher the voltage supplied to the spindle motor 24, and accordingly, the higher a rotational speed of the spindle motor 24.

Figure 5A:
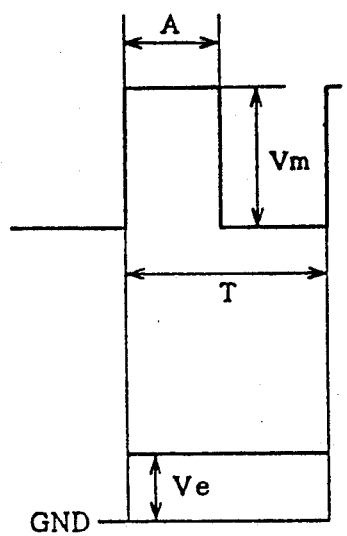
FIG. 5A is a diagram showing a relationship between a voltage of a pulse signal and an equivalent voltage when the voltage of the pulse signal has a maximum value.
Figure 5B:
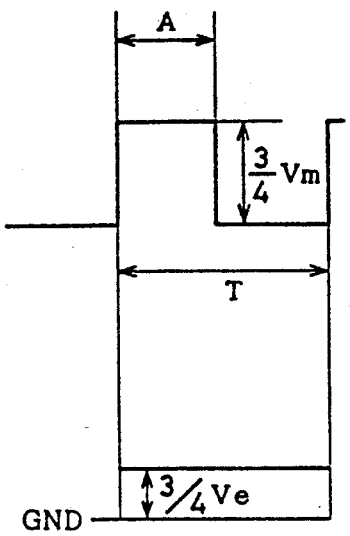
FIG. 5B is a diagram showing a relationship between a voltage of a pulse signal and an equivalent voltage when the voltage of the pulse signal is lowered, in a conventional device.

The rotational speed of the spindle motor 24 is determined in accordance with the pulse width Tp, and in a conventional device, is controlled by setting the pulse width to a value corresponding to a set speed of the spindle motor 24. As shown in FIGS. 5A and 5B, however, although the equivalent voltage Ve is obtained when the voltage of the battery 61 is Vm, if the voltage of the battery 61 is lowered to ¾ Vm, the equivalent voltage Ve is reduced to ¾. As a result, the rotational speed of the spindle motor 24 becomes lower than a set value. Namely, in a conventional device, a drive signal generated by a drive signal generating mechanism is not determined in accordance with a change of the voltage of the battery 61.

Figure 5C:
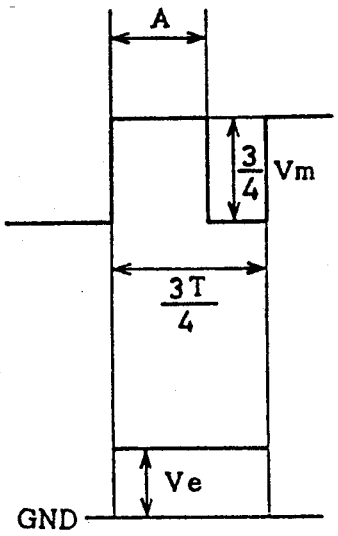
FIG. 5C is a diagram showing a relationship between a voltage of a pulse signal and an equivalent voltage when the voltage of the pulse signal is lowered, in a first embodiment of the present invention.

To prevent such a drawback, in the embodiment of the present invention, as shown in FIG. 5C, the pulse interval is reduced to (¾)T in accordance with a drop in the voltage of the battery 61, and the pulse interval is T when the voltage of the battery 61 is at the maximum value Vm. Namely, if the voltage of the battery 61 is lowered to (¾)Vm, for example, the pulse interval is changed to (¾)T in accordance with the equation (1), whereby the equation voltage Ve is maintained at the original set value. Therefore, a predetermined rotational speed of the spindle motor 24 is obtained.

Figure 6:
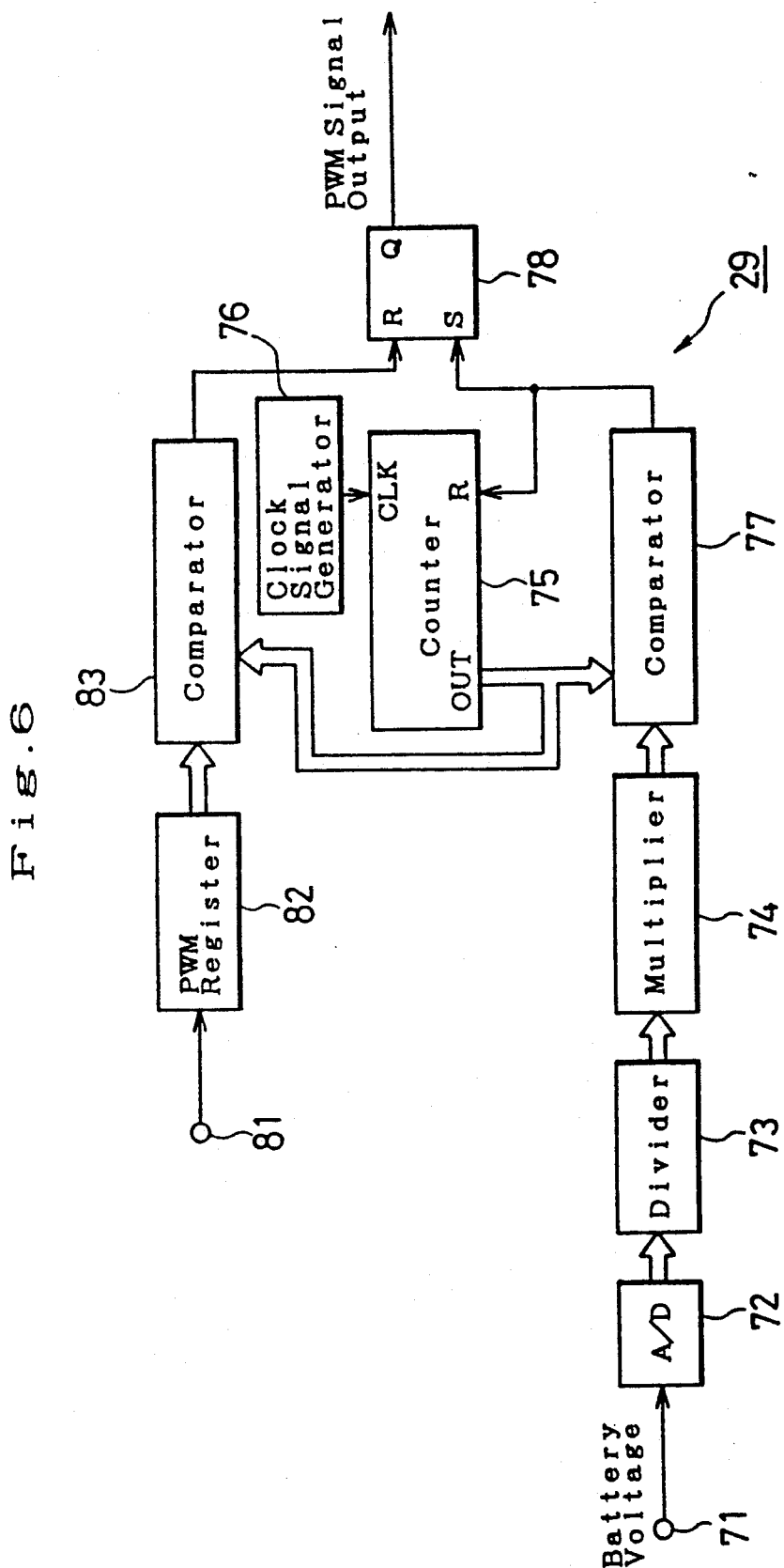
FIG. 6 is a diagram of a PWM signal generating circuit of according to a first embodiment of the present invention.

FIG. 6 show one embodiment of the PWM signal generating circuit 29. This circuit sets a pulse interval Ts of a pulse signal P (FIG. 3) corresponding to a change of a voltage of the battery 61.

An input terminal 71 is connected to the battery 61 (FIG. 2) and a source voltage Vo is applied to the PWM signal generating circuit 29 through the input terminal 71. This source voltage Vo is A-D converted by an A-D converter 72, and divided by the maximum voltage Vm by a divider 73, whereby a voltage ratio (Vo/Vm) of the current voltage and the maximum voltage is obtained. Note that the maximum voltage Vm is that which is outputted by a battery in which a voltage drop has not occurred, i.e., a new battery. In a multiplier 74, the voltage ratio (Vo/Vm) is multiplied by a count value Tc, which corresponds to a standard pulse interval, i.e., a pulse interval (T) at the maximum voltage Vm, whereby a pulse interval set value C (=(Vo/Vm)×Tc) is obtained.

Figure 7:
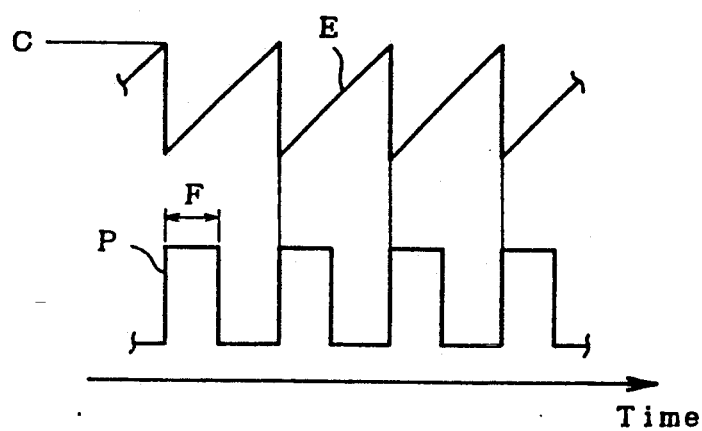
FIG. 7 is a diagram showing an operation of the PWM signal generating circuit.

A counter 75 counts clock signals inputted from a clock signal generator 76 at constant intervals, and outputs the count value (shown by reference E in FIG. 7) to a comparator 77, which compares this count value E with the pulse interval set value C obtained from the multiplier 74, and outputs a coincident signal to a set terminal S of a flip-flop 78 and a reset terminal R of the counter 75 when the count value E coincides with the set value C. Accordingly, the count value E of the counter 75 is reset to "0", and the counter 75 again starts the count operation, as shown by reference E (FIG. 7). Note that a time for which the coincident signal is inputted from the comparator 77 to the flip-flop 78 corresponds to a pulse period of a pulse signal, which changes in accordance with changes in the battery voltage.

On the other hand, input terminal 81 is connected to the spindle servo circuit 27 (FIG. 2), and a PWM set value F (FIG. 7) corresponding to a drive force for the spindle motor 24 is inputted to a PWM register 82. A comparator 83 is supplied with the PWM set value F from the PWM register 82 and the count value E from the counter 75, respectively. The comparator 83 compares this PWM set value F with the count value E, and when the count value E coincides with the PWM set value F, the comparator 83 outputs the PWM set value F to the reset terminal R of the flip-flop 78.

A signal outputted from an output terminal Q of the flip-flop 78 is made a "High" level when the coincident signal is inputted from the comparator 77 to the set terminal S of the flip-flop 78, and made a "Low" level when the coincident signal is inputted from the comparator 83 to the reset terminal R, whereby a PWM signal is generated. A pulse width "A" of this PWM signal corresponds to the PWM set value "F", shown in FIG. 7.

The PWM signal obtained in an above described manner has a pulse width corresponding to a set rotational speed of the spindle motor 24. An interval between two adjacent pulse signals is set to a small value as the actual voltage of the battery 61 is lowered, due to an operation of the PWM signal generating circuit 29. Therefore, even though an output voltage of the battery 61 is lowered, the equivalent voltage Ve obtained by the smoothing circuit having the choke coil 45 and so on (FIG. 2) has the same value as that obtained when an output voltage of the battery 61 has the maximum value. Accordingly, a servo characteristic for a driving of the spindle motor 24 is always constant, regardless of the amount of the source voltage, and thus the servo control for the spindle motor 24 is facilitated.

Although, as the voltage of the battery 61 is lowered, the pulse interval is shortened in the above embodiment, the pulse width may be lengthened in a second embodiment, which is described below.

Figure 8:
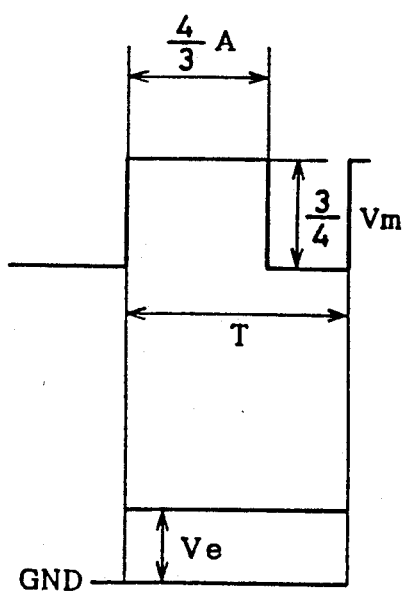
FIG. 8 is a diagram showing a relationship between a voltage of a pulse signal and an equivalent voltage when the voltage of the pulse signal is lowered, in a second embodiment of the present invention.

As shown in FIGS. 5A and 5B, if the voltage of the battery 61 is lowered to ¾ Vm, the equivalent voltage Ve is reduced to ¾. As a result, the rotational speed of the spindle motor 24 becomes lower than a set value. To prevent such a drawback, in the second embodiment of the present invention, as shown in FIG. 8, the pulse width is lengthened in accordance with a drop in the voltage of the battery 61. That is, if the voltage of the battery 61 is lowered to (¾)Vm, for example, the pulse width is changed to (4/3) A in accordance with equation (1), whereby the equation voltage Ve is maintained at the original set value. Therefore, a predetermined rotational speed of the spindle motor 24 is obtained.

FIG. 9 shows a construction of a second embodiment of a PWM signal generating circuit 29. This circuit sets a pulse width Tp of a pulse signal P (FIG. 3) corresponding to a change of a voltage of the battery 61.

An input terminal 91 is connected to the battery 61 (FIG. 2), and a source voltage Vo is applied to the PWM signal generating circuit 29 through the input terminal 91. This source voltage Vo is A-D converted by an A-D converter 92, and the maximum voltage Vm is divided by the source voltage Vo in the divider 93, whereby a voltage ratio (Vm/Vo) of the maximum voltage and the current voltage is obtained. Input terminal 101 is connected to the spindle servo circuit 27 (FIG. 1), and a count value Ac, which corresponds to a standard pulse width, i.e., a pulse width A at the maximum voltage Vm, is inputted to a PWM register 102. In a multiplier 94, the count value Ac is multiplied by the voltage ratio (Vm/Vo), so that a pulse width set value J (equals to Vm/Vo)×Ac) is obtained.

On the other hand, a period T of a pulse signal (FIG. 8) is stored in a T register 104, and has a constant value. A comparator 103 is supplied with a period value corresponding to period T from the T register 104, and count value E from counter 95, respectively. The comparator 103 compares this period value with the count value E, and outputs a coincident signal to set terminal S of the flip-flop 98 and a reset terminal R of the counter 95 when the count value E coincides with the period value.

Counter 95 counts lock signals inputted from a clock signal generator 96 at constant intervals, and outputs the count value (shown by the reference E in FIG. 7) to comparator 97, which compares this count value E with the pulse width set value J obtained from the multiplier 94, and outputs a coincident signal to a reset terminal R of flip-flop 98 when the count value E coincides with the set value J. Note that a time for which the coincident signal is inputted from the comparator 97 to the flip-flop 98 corresponds to a pulse width of a pulse signal, which changes in accordance with changes in the battery voltage.

A signal outputted from an output terminal Q of the flip-flop 98 is made a "High" level when the coincident signal is inputted from the comparator 103 to the set terminal S of the flip-flop 98, and made a "Low" level when the coincident signal is inputted from the comparator 97 to the reset terminal R, so that a PWM signal is generated. A pulse width of this PWM signal corresponds to the current voltage of the battery 61.

As described above, the PWM signal is obtained by correcting a pulse width which has a length corresponding to a set rotational speed of the motor 24, in accordance with the current voltage of the battery 61. Namely, the pulse width is set to a large value as the actual voltage of the battery 61 is lowered, due to an operation of the PWM signal generating circuit 29. Therefore, even though an output voltage of the battery 61 is lowered, the equivalent voltage Ve obtained by the smoothing circuit having the choke coil 45 and so on (FIG. 2) has the same value as that obtained when an output voltage of the battery 61 has the maximum value. Accordingly, a servo characteristic for a driving of the spindle motor 24 is always constant, regardless of the amount of the source voltage, and thus the servo control for the spindle motor 24 is facilitated.

Note that a control system of the present invention is not restricted to the spindle motor 24, and any mechanism operated in accordance with a pulse width can be applied.

Further, the pulse signal for driving the mechanism is not necessarily smoothed, but can be directly outputted to the mechanism.

Although the embodiments of the present invention have been described herein with reference to the accompanying drawings, obviously many modifications and changes may be made by those skilled in this art without departing from the scope of the invention.

The present disclosure relates to subject matter contained in Japanese patent application No. HEI2-129156 (filed on May 21, 1990) which is expressly incorporated herein by reference in its entirety.

I claim:

1. A drive signal generating device for outputting a pulse signal to a mechanism which is driven in accordance with said pulse signal, comprising:
   a power source for outputting a source voltage;
   means for generating said pulse signal; and
   means for controlling at least one of a pulse width and a pulse period of said pulse signal, in accordance with said source voltage, said control means comprising:
      means for dividing a current source voltage outputted from said power source by a maximum source voltage of said power source, to thereby obtain a voltage ratio;
      means for multiplying said voltage ratio by a value corresponding to a pulse period obtained when said maximum source voltage is outputted from said power source, to thereby obtain a pulse interval set value; and
      means for setting said pulse period in accordance with said pulse interval set value.

2. A drive signal generating device for outputting a pulse signal to a mechanism which is driven in accordance with said pulse signal, comprising:
   a power source for outputting a source voltage;
   means for generating said pulse signal; and
   means for controlling at least one of a pulse width and a pulse period of said pulse signal, in accordance with said source voltage, said control means comprising:
      means for dividing a maximum source voltage of said power source by a current source voltage outputted from said power source, to thereby obtain a voltage ratio;
      means for multiplying said voltage ratio by a value corresponding to a pulse width obtained when said maximum source voltage is outputted from said power source, to thereby obtain a pulse width set value; and
      means for setting said pulse width in accordance with said pulse width set value.

3. A drive signal generating device for outputting a pulse signal to a mechanism which is driven in accordance with said pulse signal, comprising:
   a power source for outputting a predetermined source voltage;
   means for detecting variations from said predetermined source voltage;
   means for outputting a first signal having a frequency that becomes higher as said source voltage is lowered;
   means for outputting a second signal at a predetermined timing; and
   means for generating said pulse signal, said generating means generating a signal having a high level when said first signal is inputted thereto, and generating a signal having a low level when said second signal is inputted thereto, so that a pulse period of said pulse signal generated by said generating means becomes shorter as said source voltage is lowered, in response to said variations detected by said detecting means, to maintain an operating characteristic of said mechanism at a constant level.

4. The drive signal generating device of claim 3, wherein said generating means comprises means for maintaining a power supplied to said mechanism at a constant level, irrespective of variations in said source voltage.

5. A drive signal generating device for outputting a pulse signal to a mechanism which is driven in accordance with said pulse signal, comprising:
- a power source for outputting a predetermined source voltage;
- means for detecting variations from said predetermined source voltage;
- means for outputting a first signal at a predetermined timing;
- means for outputting a second signal that has a frequency that becomes lower as said source voltage is lowered; and
- means for generating said pulse signal, said generating means generating a signal having a high level when said first signal is inputted thereto, and generating a signal having a low level when said second signal is inputted thereto, in response to said variations detected by said detecting means, to maintain an operating characteristic of said mechanism at a constant level.

6. The drive signal generating device of claim 5, wherein said generating means comprises means for maintaining a power supplied to said mechanism at a constant level, irrespective of variations in said source voltage.

7. A device for driving a mechanism, comprising:
- a power source;
- a pulse signal generator that generates a pulse signal from said power source to drive said mechanism; and
- a controller that controls at least one of a pulse width and a pulse period of said pulse signal, so that a voltage variation of said power source does not affect a driving of said mechanism, said controller comprising:
  - a divider that obtains a voltage ratio by dividing a maximum source voltage of said power source by a current source voltage outputted from said power source;
  - a multiplier that obtains a pulse width set value by multiplying said voltage ratio by a value that corresponds to a pulse width that is obtained when said maximum source voltage is outputted from said power source; and
  - a pulse width setter that sets said pulse width in accordance with said pulse width set value.

8. A device for driving a mechanism, comprising:
- a power source;
- a pulse signal generator that generates a pulse signal from said power source to drive said mechanism; and
- a controller that controls at least one of a pulse width and a pulse period of said pulse signal, so that a voltage variation of said power source does not affect a driving of said mechanism, said controller comprising:
  - a divider that obtains a voltage ratio by dividing a current source voltage outputted from said power source by a maximum source voltage of said power source;
  - a multiplier that obtains a pulse interval set value by multiplying said voltage ratio by a value corresponding to a pulse period obtained when said maximum source voltage is outputted from said power source; and
  - a pulse period setter that sets said pulse period in accordance with said pulse interval set value.

* * * * *

UNITED STATES PATENT AND TRADEMARK OFFICE
CERTIFICATE OF CORRECTION

PATENT NO. : 5,241,251
DATED : August 31, 1993
INVENTOR(S) : YOSHIO WAKUI

It is certified that error appears in the above-indentified patent and that said Letters Patent is hereby corrected as shown below:

On title page, item: [56] of the printed patent, under "FOREIGN PATENT DOCUMENTS", change "2231778" to ---2231178---.

Signed and Sealed this

Thirtieth Day of May, 1995

Attest:

BRUCE LEHMAN

*Attesting Officer*  *Commissioner of Patents and Trademarks*